UNITED STATES PATENT OFFICE.

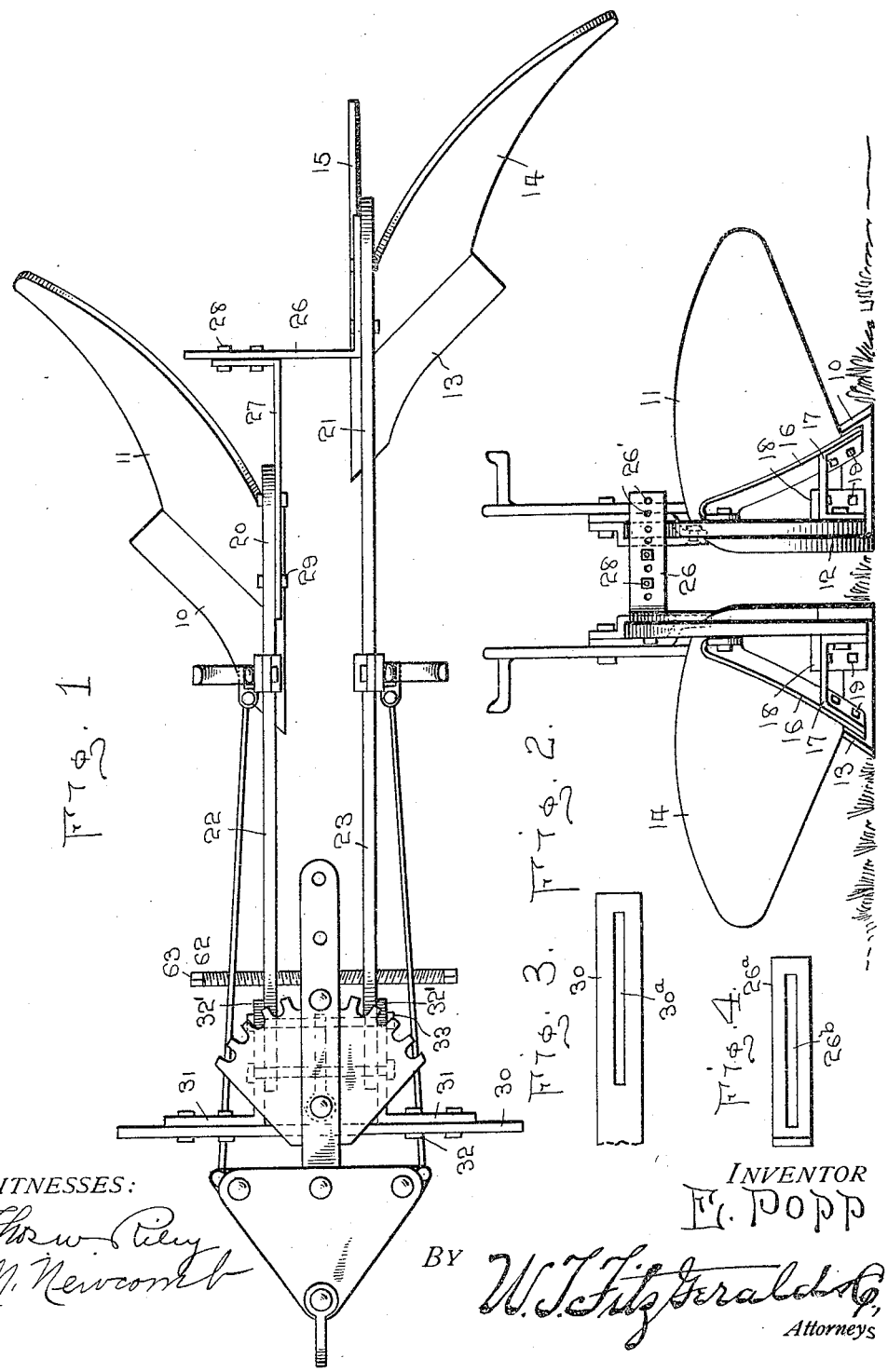

EDWARD POPP, OF EL CAMPO, TEXAS.

ADJUSTABLE PLOW MECHANISM.

1,129,516.  Specification of Letters Patent.  Patented Feb. 23, 1915.

Application filed May 21, 1912. Serial No. 698,761.

*To all whom it may concern:*

Be it known that I, EDWARD POPP, a citizen of the United States, residing at El Campo, in the county of Wharton and State of Texas, have invented certain new and useful Improvements in Adjustable Plow Mechanism; and I do hereby declare the following to be a full, clear, and exact description of the invention, such as will enable others skilled in the art to which it appertains to make and use the same.

This invention relates to plows, and it relates more particularly to an improved adjustable and reversible mechanism in plow construction.

It is well known to those who are familiar with the art of agriculture, that the best results, in raising certain crops, depends upon forming the surface of the soil, into which the crop is to be planted, into properly spaced elevated ridges. It has hitherto been customary, in ridging the surface of the soil, to plow two furrows in parallel spaced relation, turning the soil away from the unbroken space between the furrows, and thereafter splitting the said unbroken space with a plow known as a middle breaker. The primary plow, used in the method described, is adapted to turn the soil in one direction only, so that in turning the soil away from said unbroken space, the second course of travel of the plow must be directly opposite to the direction of travel in forming the first furrow.

An object of this invention is to provide a right hand turn plow and a left hand turn plow with adjusted means thereto and means to reinforce and brace said plows in the connecting of the plow to the beams so that the said braces operate to divide the pressure of forward and lateral movement of the plow between the beams and counteracting each furrow plow against the other.

A still further object of the invention is to provide a right hand turning member and a left hand turning member, of such character and in such relation to each other, that the accumulation of grass, weeds, etc., thereupon, is avoided.

Other objects and advantages may be recited hereinafter and in the claim.

In the accompanying drawings which form a part of this application, Figure 1 is a top plan view. Fig. 2 is a rear elevation view, and, Figs. 3 and 4 are fragmental detail views.

Referring to the drawings in which similar reference characters designate corresponding parts throughout the several views, the right hand breaker comprises a breaker share 10, a mold-board 11, a landside 12, a beam 22 and a stock 24; while the left-hand plow comprises a plow-share 13, a mold-board 14, a landside 15, a beam 23 and a stock 25. The several plow elements are secured together by means of braces 16 and 17 and plates 18, through the medium of bolts 19, said braces 16 being approximately diagonal braces having a back-turned portion attached to the beams and said braces 17 being approximately horizontal braces having a right angled portion and a diagonal portion, said diagonal portion being attached to said diagonal brace 16 and to the plow by means of bolts 19; said diagonal braces 16 and said horizontal braces 17 being attached to the beams. The braces 16 and 17 constructed in this manner operate to divide the pressure of forward and lateral movement of the plow between the beams to counteract each furrow plow against the other. Secured on the rear end of the member 23, is an angle-iron 26, extending laterally and at right angles to the length of the beam 23, and connecting with an angle-iron 27, by means of bolts 28; said angle-iron 27 being secured to the right hand beam 22, by means of bolts 29.

It should be understood that this plow mechanism is intended to be used in connection with some form of support (not shown), and said support may be connected in any proper way; but this particular embodiment of my invention is especially adapted to be supported by the usual form of riding-plow running-gear; and I have therefore provided a front supporting frame which comprises a horizontal supporting bar 30 and a pair of oppositely disposed angle-irons 31, the members 30 and 31 being secured together by means of bolts 32. The members 31 have rearwardly extending arms 32' and to these arms are movably secured the forward ends of the beams 22 and 23 respectively, by means of bolts 33, on which they are slidable.

When it is desired to adjust the plow elements, so as to widen the unbroken space, between the right hand turning member and the left-hand turning member, the bolts 28 are to be loosened or removed, and the right hand plow mechanism and the left hand plow mechanism may then be brought into juxtaposition, and secured in this relation by any proper means, for instance, by placing the bolts 28 into apertures 26' other than those in which they were formerly seated. When the said plow mechanisms are being juxtaposed, their front ends will slide on the bolts 33 until they come into contact with the plate 37, and any proper means may be employed for securing them in this position. As a simple, practical and easily operated means for adjusting the space between said plow mechanisms and for bringing them in juxtaposition, I may provide a right and left screw-threaded member 62, having squared end portions 63, and being screw-threaded through the beams 22 and 23, at 64. It is obvious that, by applying an ordinary wrench to the squared end portions 63, the members 62 may be rotated, thereby changing the space between the beams 22 and 23, according to the direction of rotation of the member 62. I do not limit my invention to this form of adjusting means, nor do I limit the invention to the construction of the apertured angle-iron 26; but in lieu of this latter construction, I may provide a slotted angle-iron 26ª, as shown in Fig. 6, so that when the bolts 28 are loosened, they may be caused to slide in the slot 26ᵇ; thereby avoiding the necessity for removing the bolts 28, and thus minimizing the time required for adjusting the plow mechanisms. I may also provide the bar 30 with a longitudinal slot 30ª, in which the bolts 32 may be caused to slide, and when the adjustment is accomplished in this manner, I may dispense with the oppositely screw-threaded member 62.

In operation, the agriculturist, after adjusting the plow mechanisms in proper spaced relation, plows his field therewith, by forming a number of alternately disposed furrows and ridges, leaving the adjacent furrows separated by unbroken spaces. When this operation has been completed, the agriculturist then adjusts his plow so as to bring said plow mechanisms into juxtaposition, thereby converting a two-furrow plow into a single-furrow right-and-left-turning plow for performing the function of a middle-breaker, the left-hand landside 15 is alined with the right hand land-side 12, so that when the plow is drawn, said left hand landside follows directly in the wake of the right hand land-side, and by this means, one-half of the previously unbroken strip of land is turned before the other half is turned, so that the last turned half of the strip acts as a guiding means for the plow, to prevent it from being forced laterally, by such obstructions as are usually encountered in this operation, by thus arranging the cutting edges of the turning members, one in advance of the other, a much more acute angle is presented than by the forward edges of the other and land-side, and it is therefore quite obvious that grass and weeds, such as usually accumulate on middle breakers of ordinary construction, will be sheared by the forward cutting edge of the right hand share of my improved plow.

It will be seen that the land-side of the left hand turning member extends rearwardly for a considerable distance, so as to provide the proper bearing against the ground, while the forward land-side, of the right hand turning member, extends rearwardly only a short distance, being curved up at its bottom, so as to provide ample clearance for the rear land-side 15. Another advantage derived from the shape and size of this forward land-side consists in the economy of material; since, this land-side being the principal cutting member, may need to be renewed comparatively often.

It is quite obvious that, by spacing the beams 22 and 23, a considerable distance apart, and substituting left hand turning members for the right hand turning members, or vice versa, this plow construction may be converted into a gang-plow construction; and in making the adjustments for this purpose, the brace member or angle-iron 27 may be reversed or inverted.

It will be seen that I have provided a plow of this character, which is fully capable of attaining the foregoing objects and in a thoroughly practical and efficient manner.

I do not limit my invention to the exact details of construction, combination and arrangement of parts as herewith described and illustrated, but my invention may only be limited by a reasonable interpretation of the following claim.

What I claim is:

In a device of the character described, a pair of approximately parallel beams in adjustable spaced relationship, a forward right turning furrow plow attached to one of said beams, an approximately diagonal brace having a back turned portion, an approximately horizontal brace having a right angle portion and a diagonal portion, said diagonal portion being attached to said diagonal brace and to said plow by means of bolts and said diagonal brace and said horizontal brace being attached to said beam, a rearward left turning furrow plow on said second mentioned beam, like braces thereto and means for adjusting said left turning furrow plow to said right turning furrow plow so that said furrow plow will operate as a center turning furrow plow so that said braces will operate to divide the pressure of forward and lateral movement of the plow between the beams to counteract each furrow plow against the other as and for the purpose specified.

In testimony whereof I have signed my name to this specification in the presence of two subscribing witnesses.

EDWARD POPP.

Witnesses:
EMIL KAINER,
F. J. RECK.

Copies of this patent may be obtained for five cents each, by addressing the "Commissioner of Patents, Washington, D. C."